(12) United States Patent
Kubota et al.

(10) Patent No.: US 7,709,131 B2
(45) Date of Patent: May 4, 2010

(54) FUEL CELL ENDPLATE COMPRISING CURRENT COLLECTOR PLATE AND FUEL CELL INCORPORATING SAME

(75) Inventors: Osamu Kubota, Hitachi (JP); Tomoichi Kamo, Naka (JP); Kenichi Souma, Mito (JP)

(73) Assignee: Hitachi, Ltd., Tokyo (JP)

( * ) Notice: Subject to any disclaimer, the term of this patent is extended or adjusted under 35 U.S.C. 154(b) by 879 days.

(21) Appl. No.: 11/205,081

(22) Filed: Aug. 17, 2005

(65) Prior Publication Data

US 2006/0115703 A1 Jun. 1, 2006

(30) Foreign Application Priority Data

Nov. 29, 2004 (JP) ............................. 2004-343451

(51) Int. Cl.
*H01M 2/08* (2006.01)
*H01M 2/00* (2006.01)
*H01M 2/14* (2006.01)
*H01M 2/16* (2006.01)
*H01M 2/18* (2006.01)
*H01M 2/22* (2006.01)

(52) U.S. Cl. ............................. 429/35; 429/34; 429/26
(58) Field of Classification Search ............. 429/34–35; 204/242; 427/115
See application file for complete search history.

(56) References Cited

U.S. PATENT DOCUMENTS

| | | | |
|---|---|---|---|
| 4,563,402 A * | 1/1986 | Kobayashi et al. ........... | 429/178 |
| 5,518,836 A * | 5/1996 | McCullough ................ | 429/94 |
| 5,629,104 A | 5/1997 | Crawford | |
| 5,837,110 A * | 11/1998 | Dean ........................... | 204/240 |
| 7,175,929 B2 | 2/2007 | Arita et al. | |
| 2003/0091884 A1* | 5/2003 | Scartozzi ..................... | 429/32 |
| 2005/0031926 A1* | 2/2005 | Sugimasa et al. ............. | 429/30 |
| 2005/0202297 A1* | 9/2005 | Schmitz et al. ............... | 429/32 |

FOREIGN PATENT DOCUMENTS

| | | |
|---|---|---|
| JP | 08-273696 | 10/1996 |
| JP | 2003-163026 | 6/2003 |
| JP | 2004-178849 | 6/2004 |
| WO | WO 02/01659 A1 | 1/2002 |

OTHER PUBLICATIONS

Office Action of JP Application No. 2004-343451 dated Nov. 17, 2009 with partial translation.

* cited by examiner

*Primary Examiner*—Dah-Wei D Yuan
*Assistant Examiner*—Claire L Rademaker
(74) *Attorney, Agent, or Firm*—Antonelli, Terry, Stout & Kraus, LLP.

(57) ABSTRACT

A fuel cell endplate to be combined with a membrane/electrode assembly comprising a high-polymer electrolytic membrane and electrodes sandwiching the membrane; which comprises a resin substrate, a collector plate and a gasket; the collector plate being in contact with the surface of the resin substrate and the membrane/electrode assembly; the gasket being provided so as to surround the periphery of the collector plate; a terminal connector connected to the collector plate and being disposed at a position where it does not contact with the membrane/electrode assembly.

10 Claims, 10 Drawing Sheets

FIG. 12b

FUEL CELL ENDPLATE COMPRISING CURRENT COLLECTOR PLATE AND FUEL CELL INCORPORATING SAME

CLAIM OF PRIORITY

This application claims priority from Japanese application serial no. 2004-343451, filed Nov. 29, 2004, the content of which is hereby incorporated by reference into this application.

BACKGROUND OF THE INVENTION

1. Field of the Invention

The present invention relates to fuel cell endplate and fuel cell, and particularly to a fuel cell endplate for use in a solid polymer type fuel cell or a direct methanol fuel cell that comprises a membrane/electrode assembly of a high-polymer electrolytic membrane and electrodes.

2. Related Art

A fuel cell has advantages that it has high-energy efficiency because electric energy is electro-chemically outputted directly from fuel and easily harmonizes with the environment because discharge from it is mostly water. Accordingly, attempts have been made to apply fuel cells to automobiles, distributed power supplies and electronic information processing devices. One of the major problems related to the fuel cell is how to prevent fuel leakage. The Patent Document 1 describes a gasket used as a seal for the fuel cell.

[Patent Document 1] WO 02/001659 (Summary)

The present inventors have acquired knowledge through our study that, in the case of a stacked type fuel cell comprising stacked unit cells, a main cause of the fuel leakage lies in the vicinity of manifolds. In the case of the stacked type fuel cell, for example, the fuel must be supplied evenly to all separators of the stacked fuel cell units and a lot of fuel is supplied into the manifold at a time; a pressure is applied not only in the direction of grooves of the separator but also in other directions, resulting in the breakage of the seal. On the other hand, in the case of a flat type fuel cell having multiple generators in a plane, the cause of the fuel leakage has not been revealed as yet. Recently, however, we have found out through our study that gaps are easily formed among the gasket, collector plates and a resin substrate bonded to the collector plates. The gaps are one of the main causes of the fuel leakage.

SUMMARY OF THE INVENTION

An object of the present invention is to offer a fuel cell endplate with high sealing performance and a fuel cell provided with the endplate, and particularly to offer an endplate suitable for the flat type fuel cell.

The present invention relates to a fuel cell endplate which comprises a resin substrate, a collector plate and a gasket, wherein a terminal connector of the collector plate is located at a place where as the terminal connector does not contact the membrane/electrode assembly. For example, the terminal connector is exposed to the side face of the resin substrate. The endplate of this construction can be manufactured, for example, by forming the collector plate and terminal connecter in a united form, bending the terminal connector and exposing it to the side face of the resin substrate through the resin substrate.

In addition, the present invention is concerned with a fuel cell having a membrane/electrode assembly with endplates having collector function on both sides thereof, the membrane/electrode assembly being constituted by a high-polymer electrolytic membrane and a pair of electrodes, wherein the endplates each comprises a resin substrate, a collector plate and a gasket, and wherein the terminal connectors of the collector plates are disposed at positions where the terminal connectors do not contact the membrane/electrode assembly.

BRIEF DESCRIPTION OF THE DRAWINGS

FIGS. 1 ($a$), ($b$) and ($c$) are plan views and a cross-sectional perspective view of the fuel cell endplate of an embodiment of the present invention.

FIG. 2 ($a$) is a developed view of a unit cell and ($b$) is a perspective view of the unit cell according to an embodiment of the present invention

FIGS. 7 ($a$) and ($b$) are plan views showing the fuel cell endplate having multiple collector plates.

FIG. 9 ($a$) is a developed view of a unit fuel cell and ($b$) is a sectional view of the unit fuel cell of another embodiment of the present invention.

FIG. 10 ($a$) is a plan view of a fuel cell module and ($b$) is a cross sectional view of the fuel cell module.

FIGS. 11 ($a$) and ($b$) show a method for the connection the unit cells.

FIGS. 12 ($a$) and ($b$) show another method for the connection the unit cells.

DETAILED DESCRIPTION OF THE INVENTION

Preferred embodiments are described hereunder but the present invention is not limited thereto.

Embodiment 1

Figure 1A:
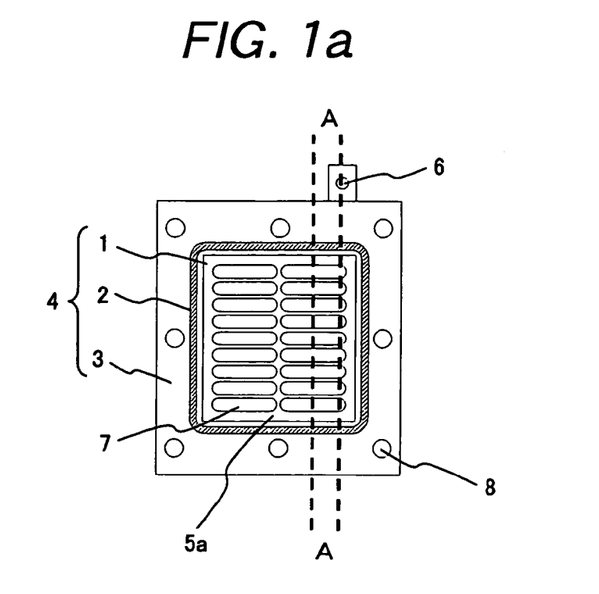
Figure 1B:
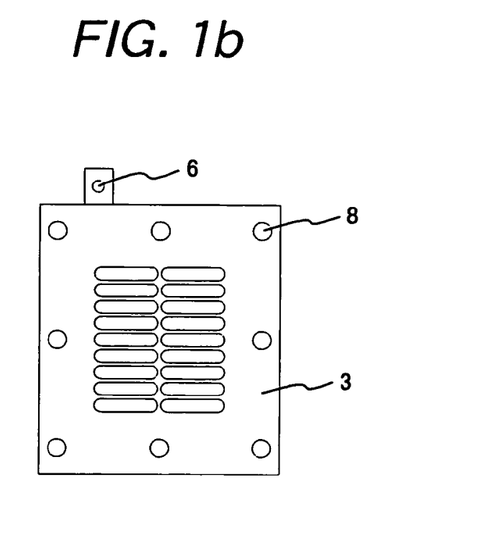
Figure 1C:
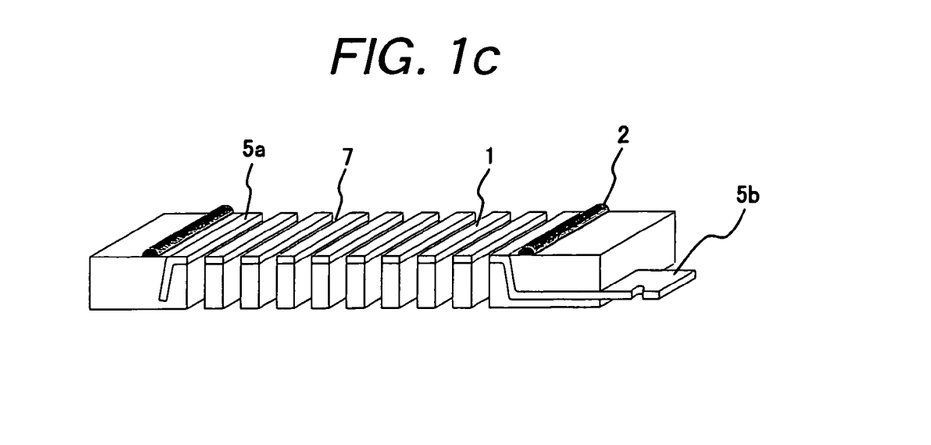

FIGS. 1($a$), ($b$) and ($c$) show the fuel cell endplate of the present invention. The fuel cell endplate 4, comprising a collector plate 1, gasket 2 and resin substrate 3, is formed into one piece for example by injection molding. The collector plate 1 has a surface 5$a$ contacting a membrane/electrode assembly and another surface 5$b$ having a terminal connector 6. Grooves 7 are formed on the surface 5$a$, where fuel is supplied and carbon dioxide is discharged through these grooves 7 when the endplate is used as anode, and air is supplied and water is discharged when used as cathode. Generated electricity can be outputted when terminal is connected with this terminal connector 6.

The fuel cell endplate is formed in two steps. The collector plate 1 and resin substrate 3 are formed together in the first step, and then the gasket 2 and resin substrate 3 are formed together in the second step. Preferable material for the collector plate 1 is one that is stable in a reaction place and also capable of collecting electricity. It can be not only be carbon but also metals including gold, platinum, stainless steel and titanium. Titanium is employed in the Embodiment 1.

However, since bare titanium causes high electric resistance due to the effect of oxide film generated on the surface, the titanium is plated with gold in about several-micrometer thick on the surface. Preferable materials for the gasket 2 are ones that are chemically stable in a reaction site and also easy to mold as the gasket 2 is formed by one-piece molding in this embodiment. It can be EPDM (ethylene-propylene-diene three-way copolymer), PET (polyethylene-terephthalate) or silicone resin, for example. EPDM was employed in the Embodiment 1. Preferable materials for the resin substrate 3 are ones that are chemically stable in a reaction site, hard enough to fasten the fuel cells as the substrate for the fuel cell endplate 4, and also easy to be molded as the resin substrate 3 is formed into one-piece molding in this embodiment. It can be, for example, AS (acrylonitrile-styrene copolymer), PEEK (polyether etherketone), PC (polycarbonate), VC (vinyl chloride) or PBT (poly butylene terephthalate). PBT was employed in the Embodiment 1.

Although the collector plate 1 and resin substrate 3 are formed together in this embodiment, it is anticipated that a gap is caused between the collector plate 1 and resin substrate 3 in case of poor molding precision and consequently liquid may leak through it because the collector plate 1 and resin substrate 3 are not chemically bonded. If liquid leakage occurs, it is preferred to add silicone resin to fill up the gap.

FIG. 1(a) shows the fuel cell endplate viewing from the side where the gasket is visible, and FIG. 1(b) shows the fuel cell endplate viewing from the other side where the gasket is not visible. As understood from the FIGS. 1(a) and (b), it is so constructed that the surface 5a contacting the membrane/electrode assembly is not exposed on the side where the gasket 2 is not visible. FIG. 1(c) is an oblique view of the section A-A in FIG. 1(a). As shown in FIG. 1(c), the collector plate 1 is a bent piece made from a single plate, and the portion exposed on the surface of the resin substrate 3 is the surface 5a contacting the membrane/electrode assembly. The portion extended inside the resin substrate and exposed outside is the other surface 5b having the terminal connector 6. The gasket 2 is formed around the periphery of the surface 5a on the resin substrate 3 so as not to contact the collector plate 1.

Figure 2A:
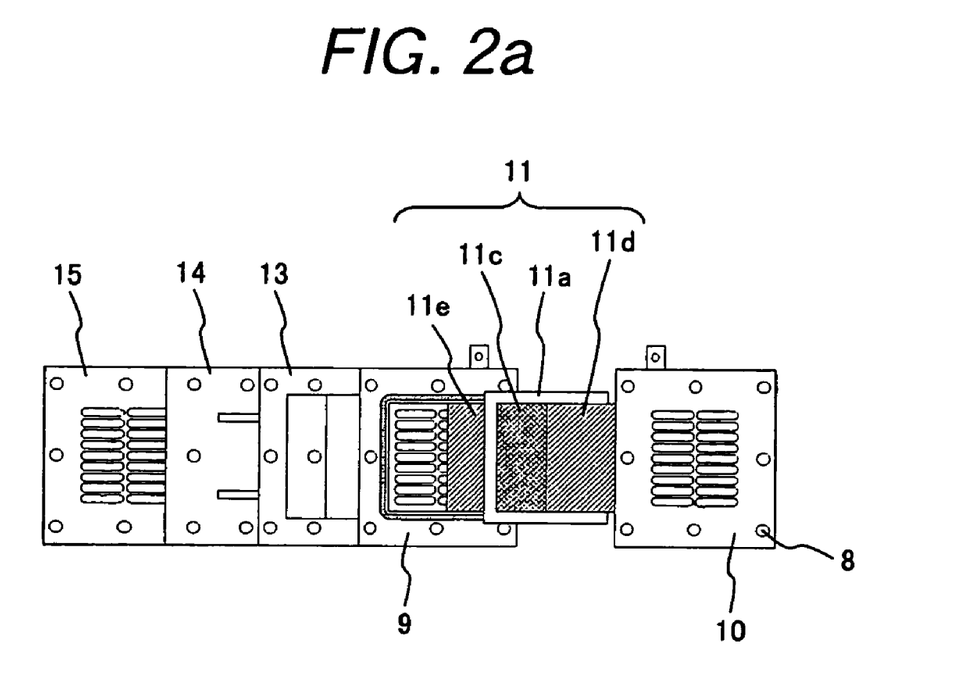
Figure 2B:
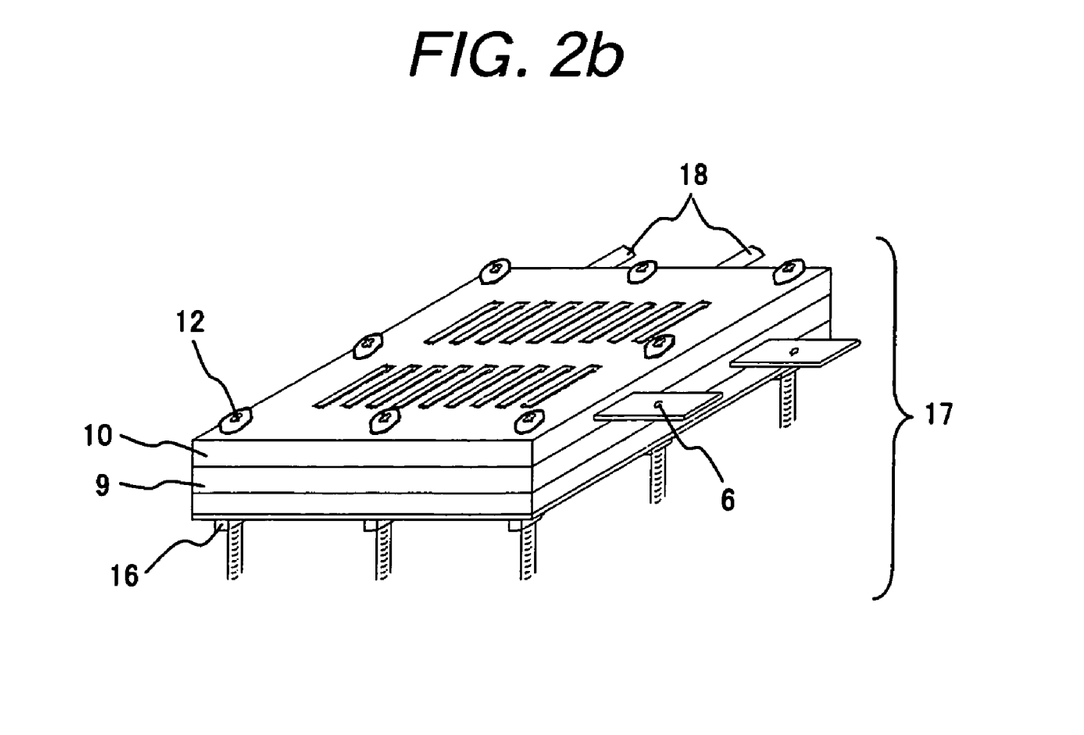

FIGS. 2(a) and (b) shows a fuel cell provided with the endplate of the invention. The membrane/electrode assembly 11 (hereinafter called the MEA) is sandwiched between an anode endplate 9 and cathode endplate 10, bolts 12 are put into though holes 8, and a fuel tank frame 13, gas-liquid separation membrane 14 and tank cover 15 are installed outside the anode endplate 9, all of which are fastened together with nuts 16 to form a unit cell 17.

The MEA 11 of this embodiment is so constructed that the electrolytic membrane 11a is provided with an anode catalyst layer (not shown) on one side and a cathode catalyst layer 11c on the other side and is further sandwiched between a cathode dispersion layer 11d and anode dispersion layer 11e. When a tube (not shown) is connected with the tube coupling 18 provided on the fuel tank frame 13 and fuel is supplied from the outside to the tube by a fuel supply device such as micro tube pump, the unit cell 17 becomes ready for generation. The gas-vapor separation membrane 14, which is a special membrane through which gas can pass but liquid cannot, plays a role of exhausting carbon dioxide generated in the tank quickly from inside the tank.

Figure 3:
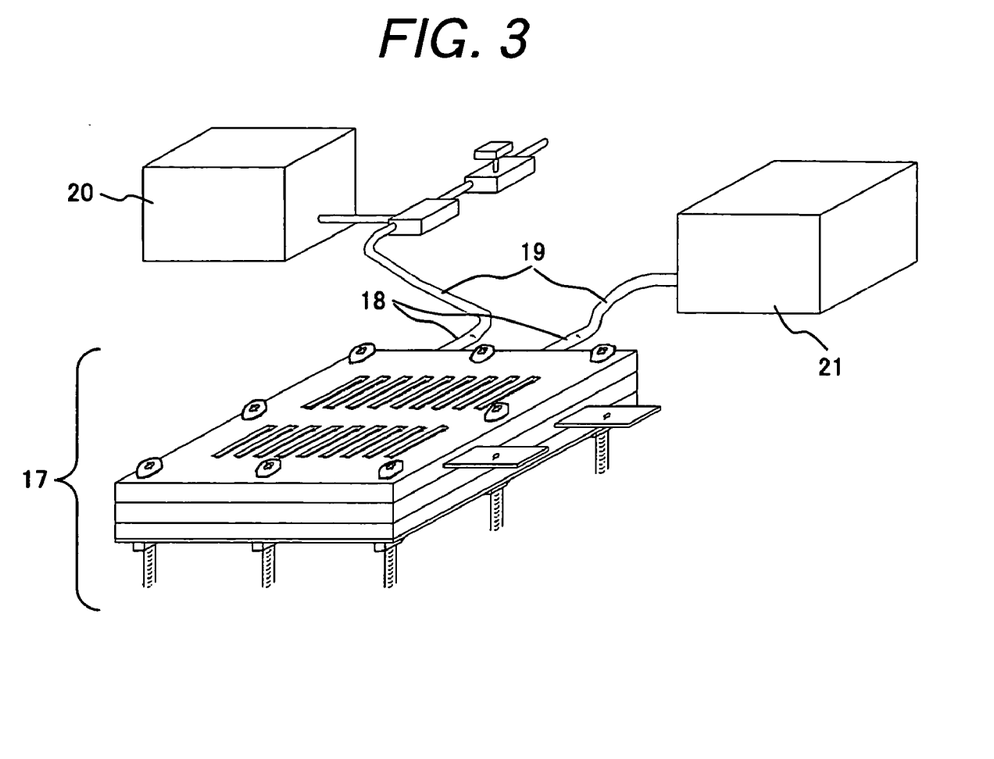
FIG. 3 is a diagrammatic view of the test equipment built for checking the sealing performance of the unit cell.

In order to verify the sealing performance, which is the effect of the present invention, we made a piece of test equipment built as in FIG. 3 and measured the fuel leakage versus the inside pressure of the tank. In this description, tank means a space formed by the anode endplate 9, fuel tank frame 13 and gas-vapor separation membrane 14.

Figure 4:
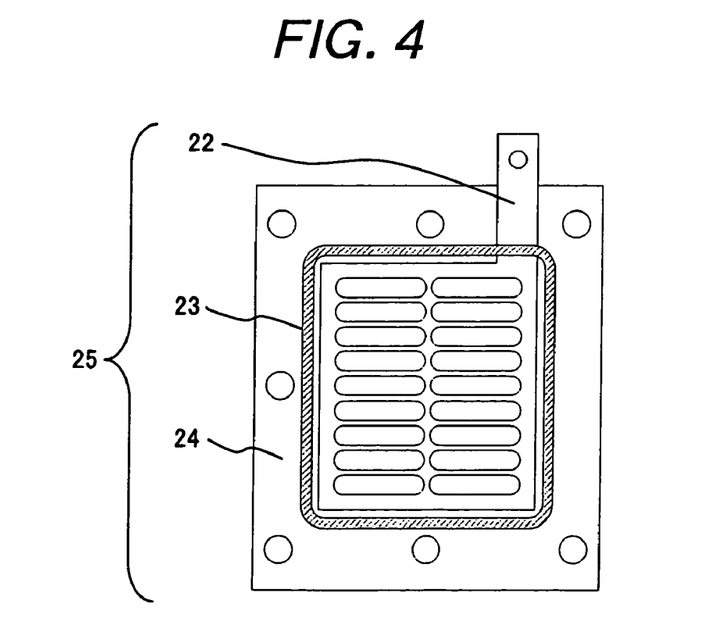
FIG. 4 is a plan view showing the fuel cell endplate of a comparative sample.

The test equipment is so constructed that two tubes 19 are connected with the two tube couplings of the unit cell 17 and that one of the tubes 19 is connected with a pressure gauge 20 and the other is connected with a pressurizing unit 21. The pressurizing unit 21 consists of a liquid reservoir (not shown) and external piping (not shown) of the liquid reservoir. By adjusting the flow rate of the liquid using a flow meter (not shown), the internal pressure of the tank can be freely controlled. For a comparison purpose in this test, we also made a fuel cell endplate 25 comprising a collector plate 22, of which terminal connector was provided on the surface of the resin substrate, i.e. the surface contacting the MEA, gasket 23 and resin substrate 24 and assembled a unit cell in the same manner as in the present invention.

Table 1 shows the verification result of the sealing performance improvement, which is the effect of the present invention. The test was carried out as follows: the flow rate of the gas incoming into the pressurizing unit 21 was controlled and, when a set pressure was reached, the incoming gas was stopped to maintain a constant pressure; after this condition was kept for two minutes, leakage from the tank was checked. In Table 1, "○" means no leakage from the tank was observed and "X" means leakage was observed. The comparative samples 1 to 3 in Table 1 employ the unit cell 25 in FIG. 4 using different gaskets. On the comparative sample 1, one each silicone rubber gasket of 300 μm thick is put on both sides of the electrolytic membrane. On the comparative sample 2, one each three-layer gasket (hardness 60 degree) of 220 μm thick (EPDM 95 μm/PET 50 μm/EPDM 75 μm) was put on each of the sides of the electrolytic membrane. In the comparative sample 3, one each three-layer gasket (hardness 70 degree) of 220 μm thick (EPDM 95 μm/PET 50 μm/EPDM 75 μm) was put on each of the sides of the electrolytic membrane. As clearly shown in Table 1, the sealing performance has improved on the unit cell that employs the fuel endplate of the present invention.

TABLE 1

| Test Cell | Test pressure: kPa | | | | | | | | | | | | | | | | |
|---|---|---|---|---|---|---|---|---|---|---|---|---|---|---|---|---|---|
| | 0 | 20 | 40 | 60 | 80 | 100 | 120 | 140 | 160 | 180 | 200 | 220 | 240 | 260 | 280 | 300 | 320 |
| Present invention | ○ | ○ | ○ | ○ | ○ | ○ | ○ | ○ | ○ | ○ | ○ | ○ | ○ | ○ | ○ | ○ | ○ |
| Comparative sample 1 | ○ | ○ | ○ | X | X | X | X | X | X | X | X | X | X | X | X | X | X |
| Comparative sample 2 | ○ | ○ | X | X | X | X | X | X | X | X | X | X | X | X | X | X | X |
| Comparative sample 3 | ○ | ○ | X | X | X | X | X | X | X | X | X | X | X | X | X | X | X |

Embodiment 2

Figure 5:
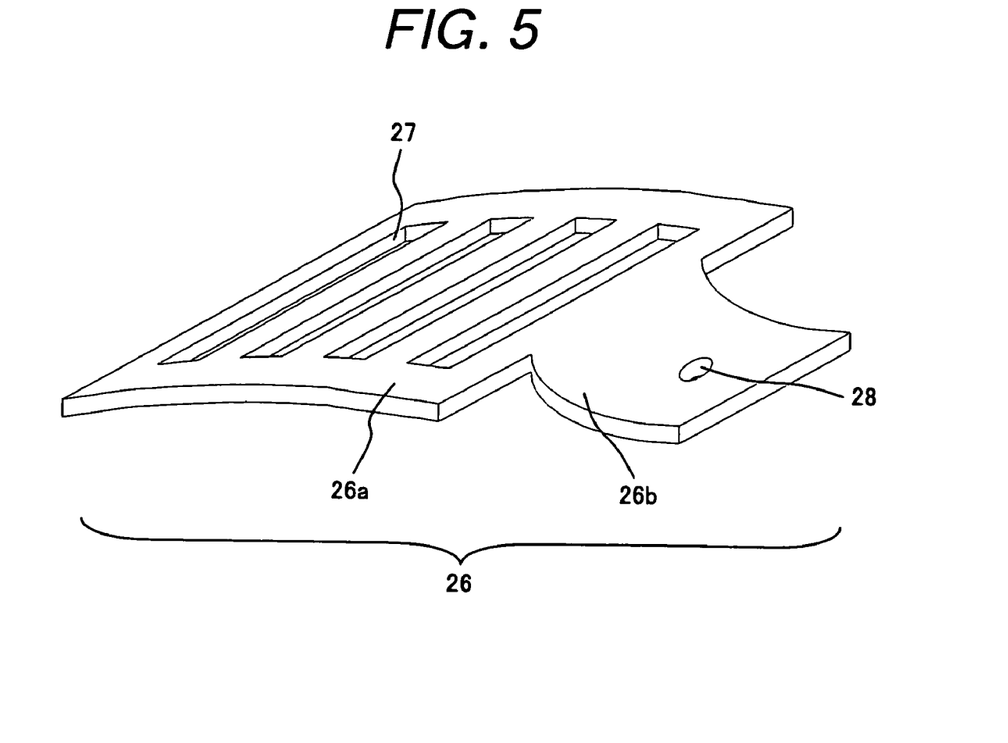
FIG. 5 is a perspective view of an embodiment of the collector plate used in the fuel cell endplate of the present invention.

FIG. 5 shows another embodiment of the fuel cell endplate of the present invention. In this embodiment, the collector plate 26 consists of curved surfaces 26a and 26b. The curved surface 26a contacts the MEA directly and, through the grooves 27 formed on the surface 26a, fuel is supplied and carbon dioxide is discharged when the endplate is used as anode, and air is supplied and water is discharged when used as cathode. A terminal connector 28 is provided on the curved surface 26b and generated electricity can be outputted when terminal is connected with this terminal connector 28. The endplate of this construction produces an effect that the MEA can be fastened positively.

Embodiment 3

Figure 6:
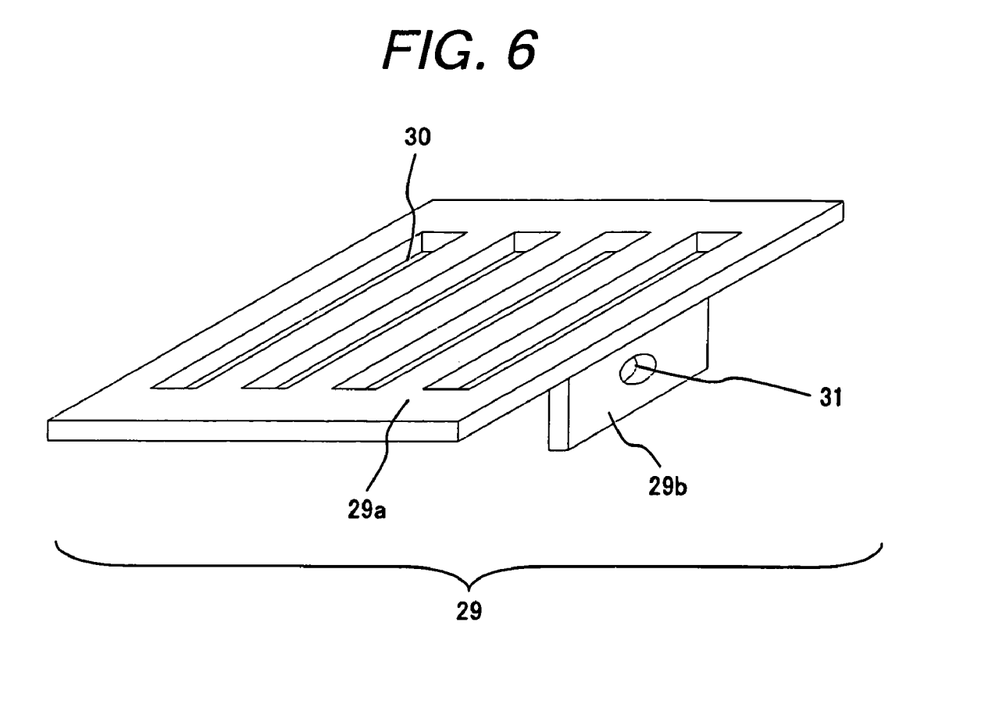
FIG. 6 is a perspective view of another embodiment of the collector plate.

FIG. 6 shows another embodiment of the collector on the fuel cell endplate of the present invention. In this embodiment, the collector plate 29 consists of two flat surfaces. Positions of the two flat surfaces are so correlated with each other that one flat surface 29b is connected perpendicularly with the other flat surface 29a. The flat surface 29a contacts the MEA directly and, through the grooves 30 formed on the flat surface 29a, fuel is supplied and carbon dioxide is discharged when the endplate is used as anode, and air is supplied and water is discharged when used as cathode. The flat surface 29b is connected perpendicularly with the other side of the flat surface 29a opposed to the side contacting the MEA directly, on which a terminal connector 31 is provided and generated electricity can be outputted when terminal is connected with this terminal connector 31.

Embodiment 4

Figure 7A:
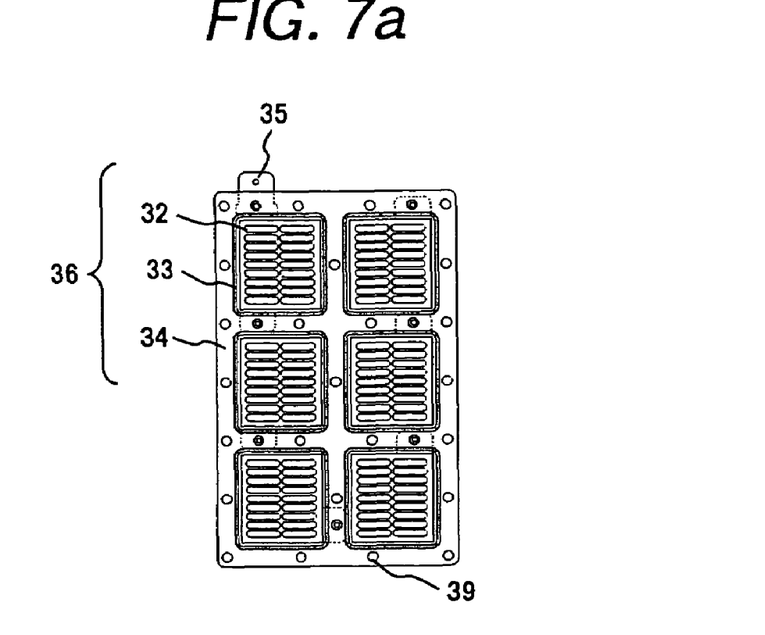
Figure 7B:
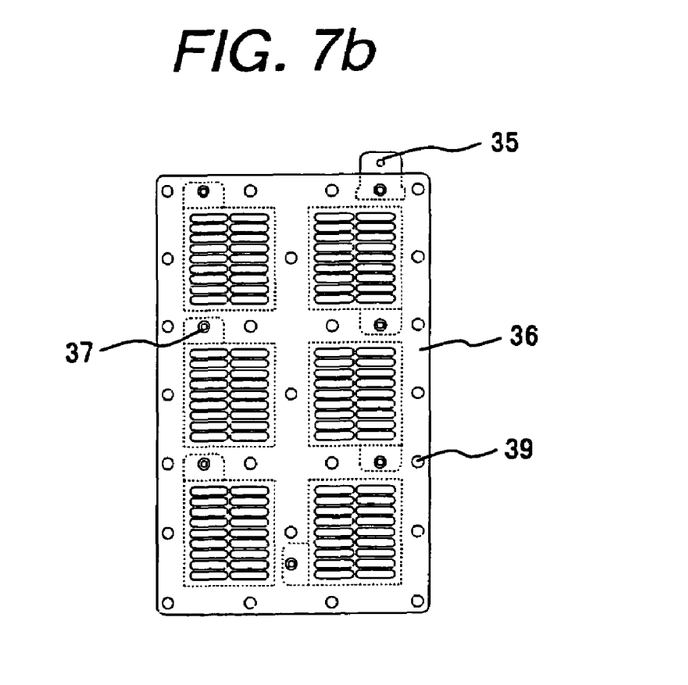

Another embodiment of the fuel cell endplate and a fuel cell using the fuel cell endplate are described hereunder. FIGS. 7(a) and (b) shows the fuel cell endplate. The fuel cell endplate 36 comprises a collector plate 32, gasket 33 and resin substrate 34, and an external terminal connector 35 is provided on part of the collector plate 32. The external terminal connector 35 is exposed on the side of the fuel cell endplate 36. FIG. 7(a) shows the fuel cell endplate 36 viewing from the side where the gasket 33 is visible, and FIG. 7(b) shows the same viewing from the other side.

As understood from the FIGS. 7(a) and (b), it is so constructed that the collector plate 32 is not exposed on the side where the gasket 33 is not visible.

Figure 8:
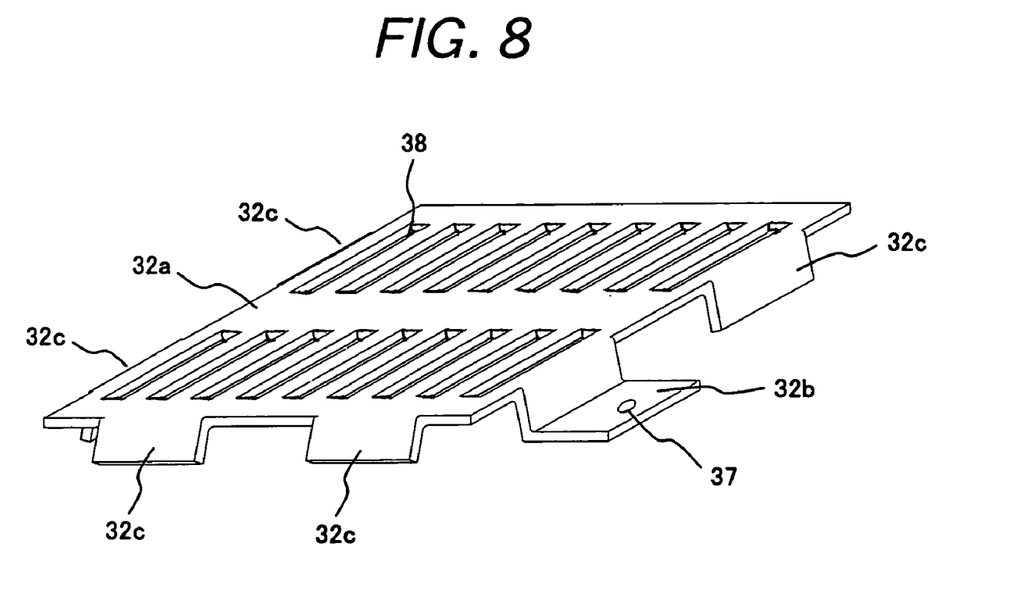
FIG. 8 is a perspective view showing another embodiment of the collector cell.

For easier understanding, portions of the collector plate 32 and terminal connector 35 embedded in the resin substrate 34 are shown in dotted line. Six collector plates 32 and six gaskets 33 are installed on one fuel cell endplate 36, which forms six unit cells in series when assembled into a fuel cell. The fuel cell endplate 36 is formed into one-piece molding. It is formed in two steps. The collector plate 32, resin substrate 34 and external terminal connector 35 are formed together in the first step, and then the gasket 33 and resign substrate 34 are formed together in the second step. As shown in FIG. 8, the collector plate 32 is a bent piece made from a single plate, containing the surfaces 32a, 32b and 32c.

The surface 32a contacts the MEA and the surface 32b is provided with the terminal connector 37. The surface 32c is provided so that the collector plate 32 and resin substrate 34 are tightly fastened with each other when molded into one piece. Grooves 38 are formed on the surface 32a, where fuel is supplied and carbon dioxide is discharged through these grooves 38 when the endplate is used as anode, and air is supplied and water is discharged when used as cathode. The gasket 33 is formed around the periphery of the surface 32a on the resin substrate 34 so as not to contact the collector plate 32. Symbol 39 represents through hole.

As understood from FIGS. 7(a) and (b), the area of the fuel cell endplate 36 depends upon the size of the collector plate 32. In this embodiment, reduction of size has been considered in view of future application to mobile devices. The size of the surface 32a of the collector plate 32 has not been reduced as it affects the output, but the surface 32b is made as small as possible. While the external terminal connector 35 has been provided so as to be connected with external terminal for outputting the power after the endplate is assembled into a fuel cell, it is not always necessary because the terminal connector 37 is already provided. In this embodiment, however, an external terminal connector has been provided because connection with external terminal becomes easier in assembling a fuel cell if a portion for connecting with external terminal is provided on the side of the fuel cell endplate.

Figure 9A:
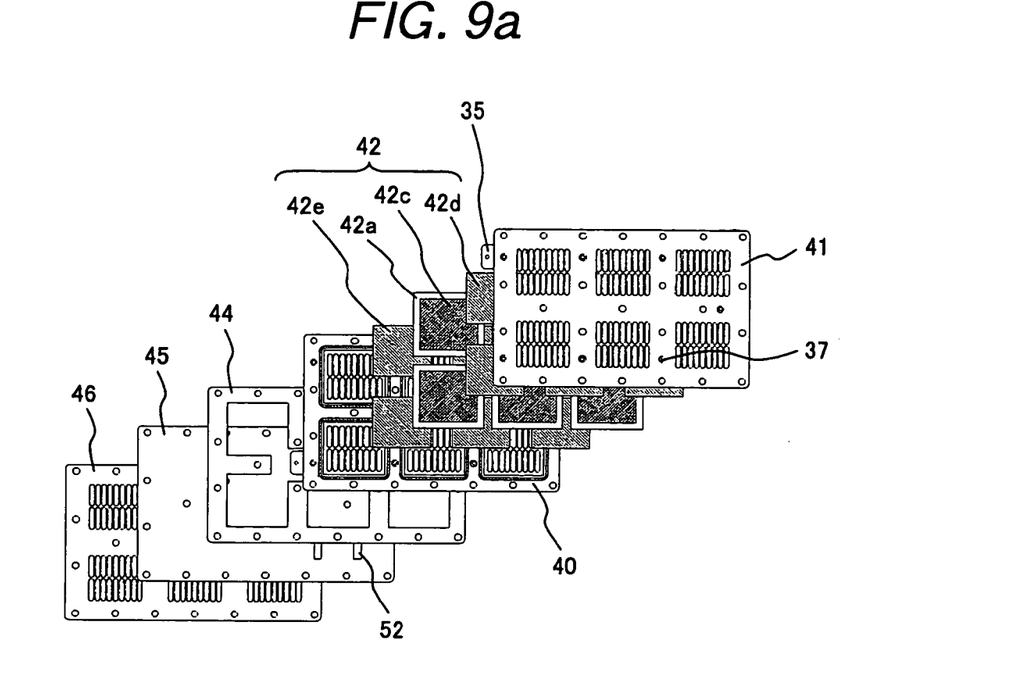
Figure 9B:
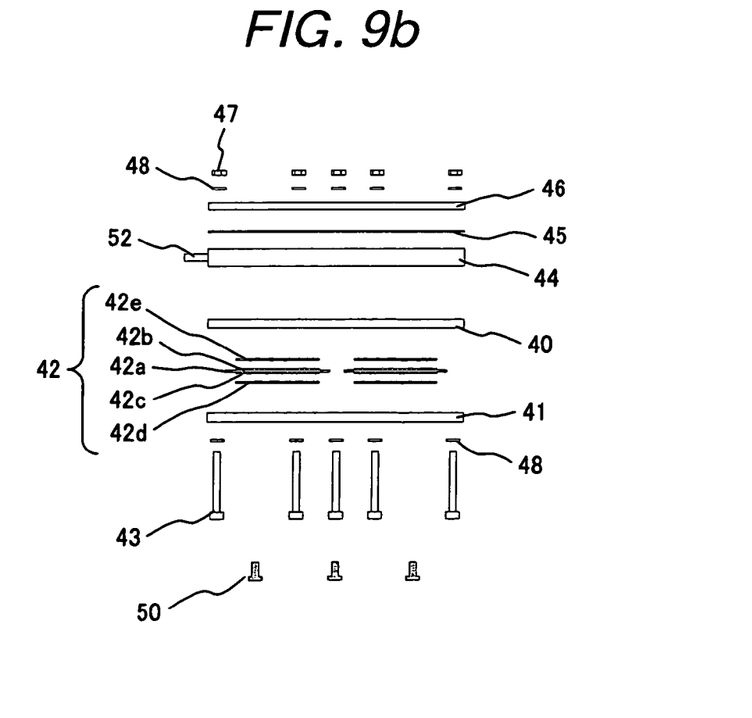
Figure 10A:
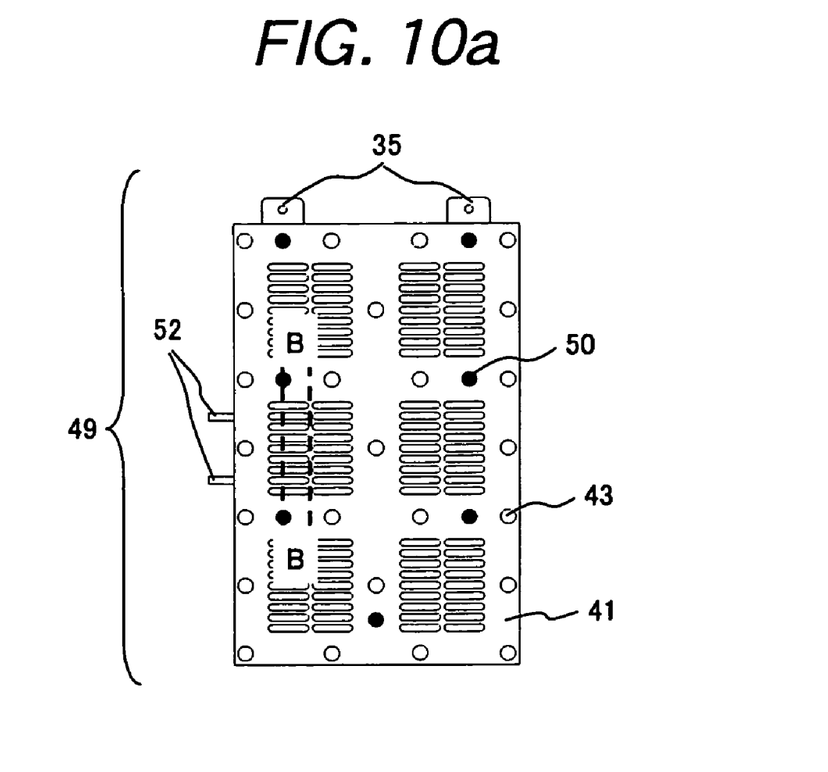
Figure 10B:
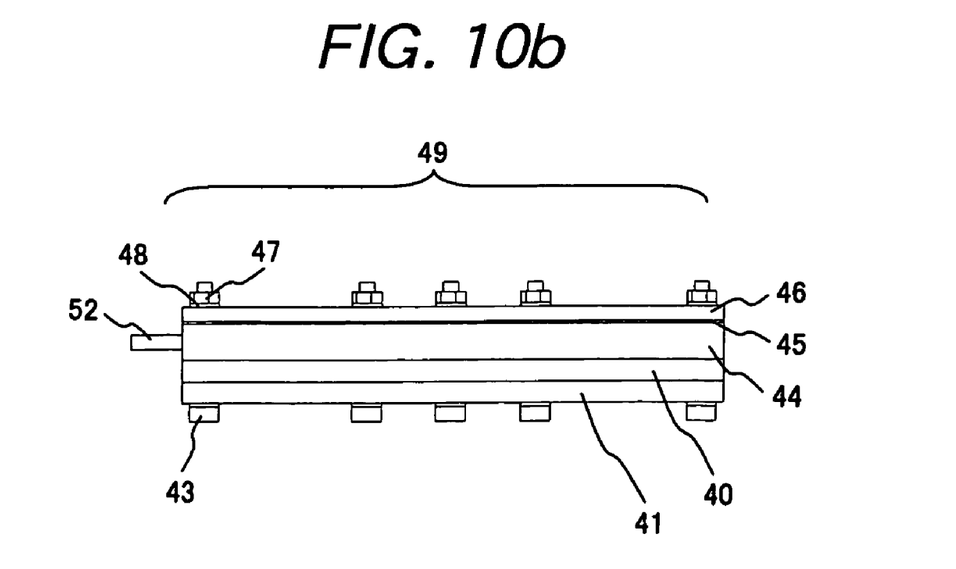

Materials for the collector plate 32 and external terminal connector 35 of this embodiment are titanium, of which surface is gold plated by several μm thick. The gasket 33 is EPDM, and the resin substrate is PBT. As shown in FIGS. 9(a) and (b), the MEA 42 (electrolytic membrane 42a, with an anode catalyst layer 42b on one side and a cathode catalyst layer 42c on the other side sandwiched between a cathode dispersion layer 42d and an anode dispersion layer 42e) is sandwiched between an anode endplate 40 and cathode endplate 41, bolts 43 are put into though holes 39, and a fuel tank frame 44, gas-liquid separation membrane 45 and tank cover 46 are installed outside the anode endplate 40, all of which are fastened together with nuts 47 and washers 48 to form a fuel cell module 49 shown in FIGS. 10(a) and (b). In FIG. 9(a), however, the bolts 43, nuts 47 and washers 48 are not shown.

Figure 11A:
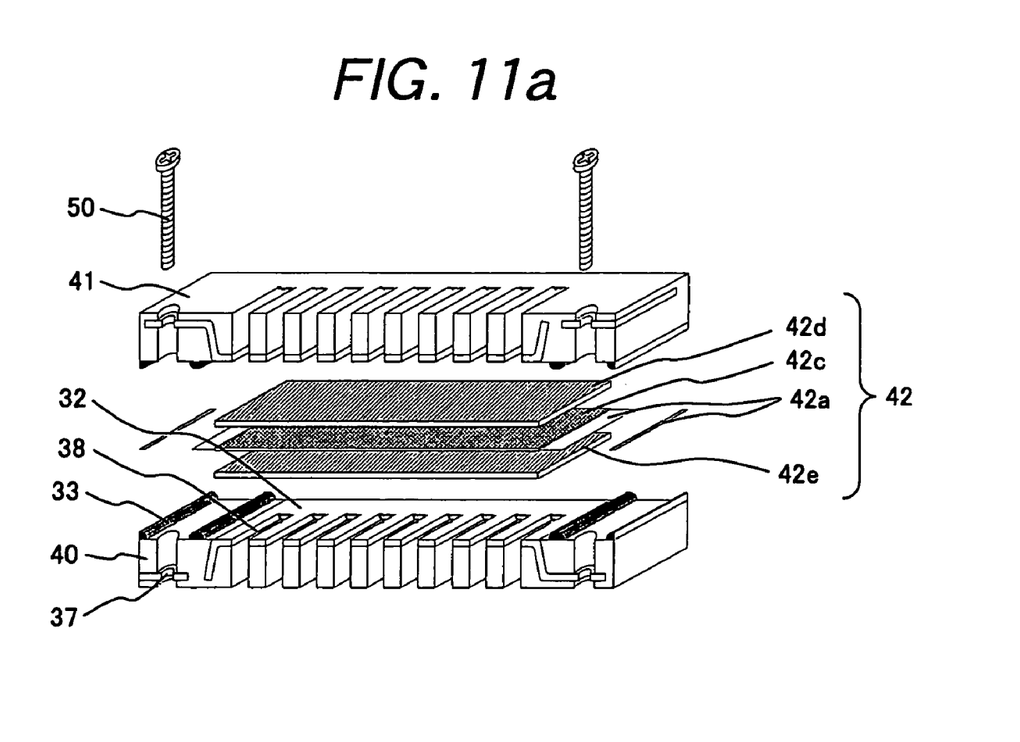
Figure 11B:
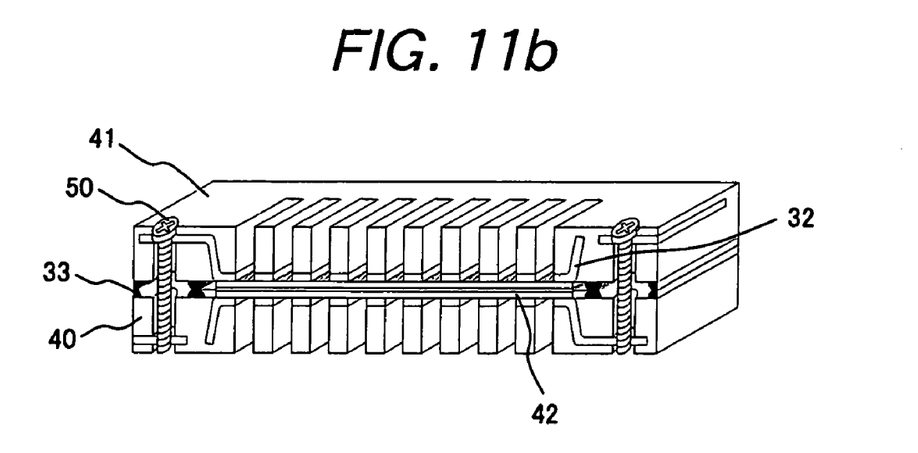
Figure 12A:
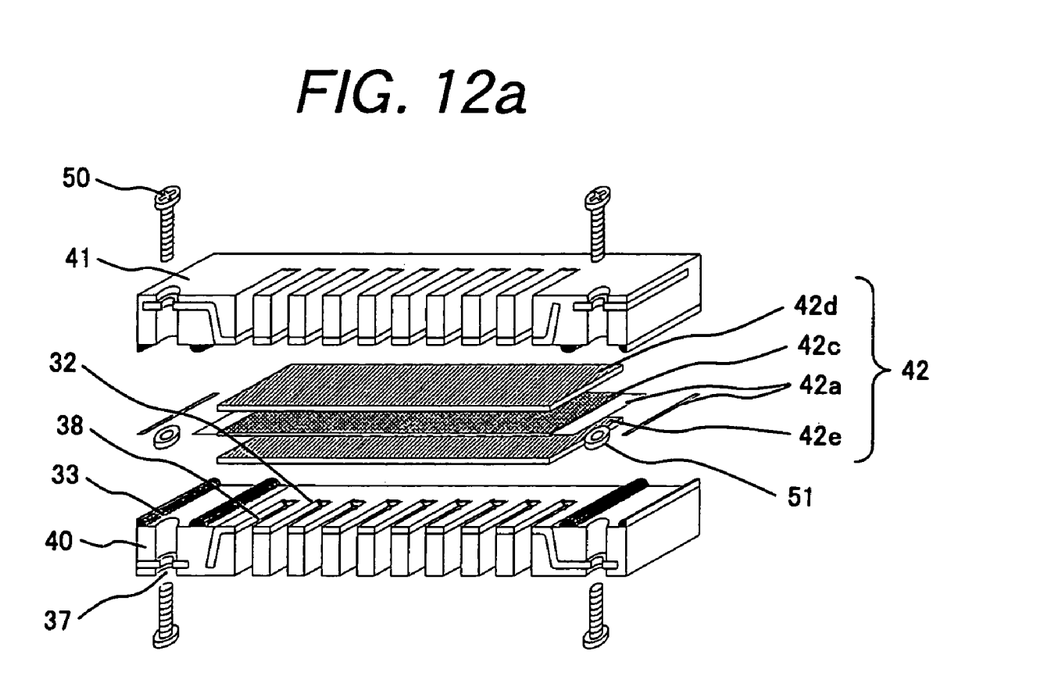
Figure 12B:
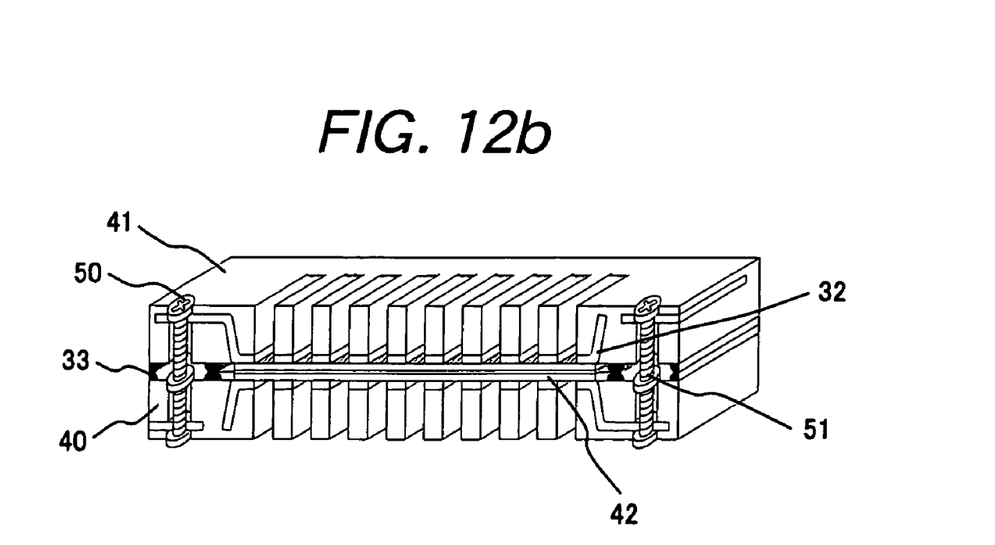

Individual unit cells are connected with each other by a collection bolt 50. FIGS. 11(a) and (b) is a cross-sectional view for better understanding the connection between each unit cell. It is a B-B cross-section of FIG. 10(a). In order to highlight the connection between unit cells, the bolts 43, fuel tank frame 44, gas-vapor separation membrane 45, tank cover 46, nuts 47 and washers 48 are not shown in the figure. FIG. 11(a) shows a module before assembly and FIG. 11(b) shows an assembled module. FIGS. 12(a) and (b) shows another method for the connection between unit cells. Also in this figure, the bolts 43, fuel tank frame 44, gas-vapor separation membrane 45, tank cover 46, nuts 47 and washers 48 are not shown in order to highlight the connection between the unit cells. FIG. 12(a) shows a module before assembly and FIG. 12(b) shows an assembled module. A collection bolt 50 is inserted from both sides of the two fuel cell endplates 36 and connected with each other by a collection nut 51.

Comparing the connection of the unit cells shown in FIGS. 11(a) and (b) with the connection of the unit cells shown in FIGS. 12(a) and (b), the method in FIG. 12 can connect more tightly but results in lower productivity because more number of parts are needed. Accordingly, in this embodiment, the method in FIG. 11 is employed. The MEA of this embodiment is so constructed that the electrolytic membrane 42a is provided with an anode catalyst layer on one side and a cathode catalyst layer 42c on the other side and is further sandwiched between a cathode dispersion layer 42d and anode dispersion layer 42e. When a tube (not shown) is connected with the tube coupling 52 provided on the fuel tank frame 44 and fuel is supplied from the outside to the tube by a fuel supply device such as micro tube pump (not shown), the unit cell module 49 becomes ready for generation.

In order to verify the sealing performance, which is the effect of the present invention, we built a piece of same test equipment as in FIG. 3 and measured the fuel leakage versus the inside pressure of the tank.

Table 2 shows the verification result of the sealing performance. The test was carried out as follows in the same procedure as in the Embodiment 1: the flow rate of the gas incoming into the pressurizing unit was controlled and, when a set pressure was reached, the incoming gas was stopped to maintain a constant pressure; after this condition was kept for two minutes, leakage from the tank was checked. "○" in the table means no leakage from the tank was observed at the test pressure and "X" means leakage was observed. "Present invention" in Table 2 represents the fuel cell module 49 and "Comparative samples 1 to 3" represent the fuel cell modules employing the fuel cell endplate constructed as shown in FIG. 4, using different gaskets as explained in the Embodiment 1. The risk of fuel leakage normally increases as the number of cells employed increases. As shown in Table 2, however, tremendously higher sealing performance has been verified on the fuel cell module 49 that employs the fuel cell endplate of the present invention than on the comparative sample.

TABLE 2

| Test cell | Test pressure: kPa | | | | | | | | | | | | | | | | |
|---|---|---|---|---|---|---|---|---|---|---|---|---|---|---|---|---|---|
| | 0 | 20 | 40 | 60 | 80 | 100 | 120 | 140 | 160 | 180 | 200 | 220 | 240 | 260 | 280 | 300 | 320 |
| Present invention | ○ | ○ | ○ | ○ | ○ | ○ | ○ | ○ | ○ | ○ | ○ | ○ | ○ | ○ | ○ | ○ | ○ |
| Comparative sample 1 | ○ | X | X | X | X | X | X | X | X | X | X | X | X | X | X | X | X |
| Comparative sample 2 | ○ | X | X | X | X | X | X | X | X | X | X | X | X | X | X | X | X |
| Comparative sample 3 | ○ | X | X | X | X | X | X | X | X | X | X | X | X | X | X | X | X |

The present invention enables to obtain a fuel cell endplate having excellent sealing performance and has solved the fuel leakage problem involved in sold high-polymer fuel cell containing membrane/electrode assembly.

According to the present invention, a fuel cell endplate with high sealing performance can be offered.

What is claimed is:

1. A fuel cell endplate to be combined with a membrane/electrode assembly comprising a high-polymer electrolytic membrane and electrodes sandwiching the membrane; which comprises a resin substrate, a collector plate and a gasket; the collector plate being in contact with the surface of the resin substrate and to be in contact with the membrane/electrode assembly when the fuel cell endplate and the membrane electrode assembly are combined; the gasket being provided so as to surround the periphery of the collector plate; a terminal connector connected to the collector plate and being disposed at a position where it does not contact with the membrane/electrode assembly when the fuel cell endplate and the membrane electrode assembly are combined, wherein the collector plate and terminal connector are formed into one piece, and an end of the terminal connector is bent and is exposed to a side face of the resin substrate through the resin substrate.

2. A fuel cell endplate to be combined with a membrane/electrode assembly comprising a high-polymer electrolytic membrane and electrodes sandwiching the membrane; which comprises a resin substrate, a collector plate and a gasket; the collector plate being in contact with the surface of the resin substrate and to be in contact with the membrane/electrode assembly when the fuel cell endplate and the membrane electrode assembly are combined; the gasket being provided so as to surround the periphery of the collector plate; a terminal connector connected to the collector plate and being disposed at a position where it does not contact with the membrane/electrode assembly when the fuel cell endplate and the membrane electrode assembly are combined, wherein the collector plate has a curved face, which is in contact with the membrane/electrode assembly.

3. The fuel cell endplate according to claim 1, wherein the collector plate, gasket and resin substrate are molded into one piece.

4. The fuel cell endplate according to claim 1, wherein multiple collector plates are provided on the surface of the resin substrate.

5. A fuel cell equipped with an endplate having collector functions on both sides of a membrane/electrode assembly comprising a high-polymer electrolytic membrane and electrodes sandwiching the membrane; wherein the endplate comprises a resin substrate, a collector plate formed on the surface of the substrate and a gasket for sealing the substrate and the collector plate; the collector plate being located so as to contact the membrane/electrode assembly; the gasket being provided so as to surround the periphery of the collector plate; and wherein a terminal connector is provided to the collector plate, which is not in contact with the membrane/electrode assembly, wherein the collector plate and terminal connector are formed into one piece, and an end of the terminal connector is bent and is exposed to a side face of the resin substrate through the substrate.

6. A fuel cell equipped with an endplate having collector functions on both sides of a membrane/electrode assembly comprising a high-polymer electrolytic membrane and electrodes sandwiching the membrane, wherein the endplate is the endplate according to claim 2.

7. The fuel cell according to claim 5, wherein the collector plate, gasket and resin substrate are molded into one piece.

8. The fuel cell according to claim 5, wherein multiple collector plates are provided to the surface of the resin substrate.

9. The fuel cell according to claim 5, wherein the gasket is provided on the resin substrate so as not to contact the collector plate.

10. The fuel cell endplate according to claim 1, wherein the gasket is provided on the resin substrate so as not to contact the collector plate.

* * * * *